United States Patent [19]

Kuhlmann et al.

[11] Patent Number: 4,972,183

[45] Date of Patent: Nov. 20, 1990

[54] METHOD FOR TRANSMITTING TERMINAL-SPECIFYING PROGRAM PARAMETER DATA FROM A COMMUNICATIONS INSTALLATON TO COMMUNICATIONS TERMINAL EQUIPMENT

[75] Inventors: Klaus Kuhlmann, Munich; Hermann Dibos, Remchingen; Albert Weiss, Munich; Klaus Kuhn, Germering; Nikolaus Spicker, Ottobrunn, all of Fed. Rep. of Germany

[73] Assignee: Siemens Aktiengesellschaft, Berlin and Munich, Fed. Rep. of Germany

[21] Appl. No.: 374,653

[22] Filed: Jun. 30, 1989

[30] Foreign Application Priority Data

Jul. 14, 1988 [DE] Fed. Rep. of Germany ....... 3823914

[51] Int. Cl.$^5$ .................... H04Q 3/545; H04Q 1/30
[52] U.S. Cl. .................... 340/825.22; 340/825.06; 340/825.15; 364/138; 370/17
[58] Field of Search .................... 340/825.06, 825.14, 340/825.15, 825.16, 825.2, 825.22; 370/17, 60, 62, 94.1, 94.3, 32; 379/29; 364/130, 138, 141, 200, 900; 371/10.1, 11.1

[56] References Cited

U.S. PATENT DOCUMENTS

| | | |
|---|---|---|
| 4,054,757 | 10/1977 | LeJay . |
| 4,381,561 | 4/1983 | Treiber . |
| 4,694,452 | 9/1987 | Beckinger et al. . |
| 4,831,582 | 5/1989 | Miller et al. .................... 364/138 |
| 4,835,699 | 5/1989 | Mallard .................... 340/825.06 |
| 4,855,906 | 8/1989 | Burke .................... 364/138 |
| 4,864,557 | 9/1989 | Morton et al. .................... 370/17 |

FOREIGN PATENT DOCUMENTS 3732679.1 9/1987 Fed. Rep. of Germany .
0148918 8/1984 Japan .................... 340/825.15

Primary Examiner—Donald J. Yusko
Assistant Examiner—Eric O. Pudpud
Attorney, Agent, or Firm—Hill, Van Santen, Steadman & Simpson

[57] ABSTRACT

A method for transmitting equipment-specifying program parameter data from a communications installation to communications terminal equipment. The method provides for transmitting program parameter data from a communications installation to a plurality of communications terminal equipment connected thereto and is based on a message-oriented transmission protocol that is used in the sense of an information exchange in the signalling channel between the equipment. In the communications equipment, the input and output devices as well as the procedures of performance features and local performance features are essentially controlled with the assistance of the program parameter data. A transmission of program parameter data is initiated either by a parameter request message transmitted from the communications terminal equipment or by an internal request of the communications installation. In a start of parameter message, address and parameter defining criteria are transmitted from the communications installation to the respective communications terminal equipment. Subsequently, the program parameter data embedded into a parameter message are transmitted to the respective communications terminal equipment and are stored in them.

8 Claims, 4 Drawing Sheets

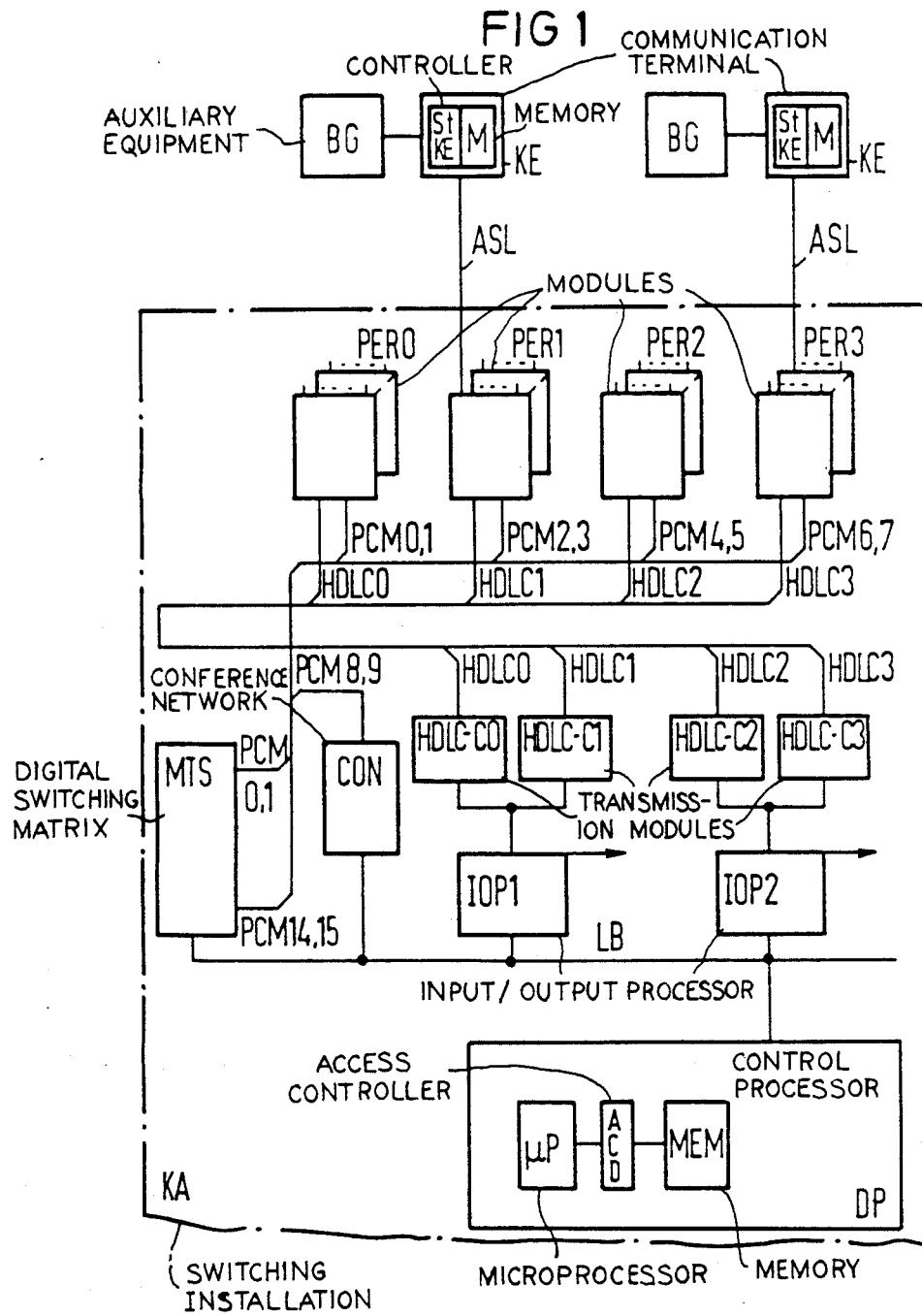

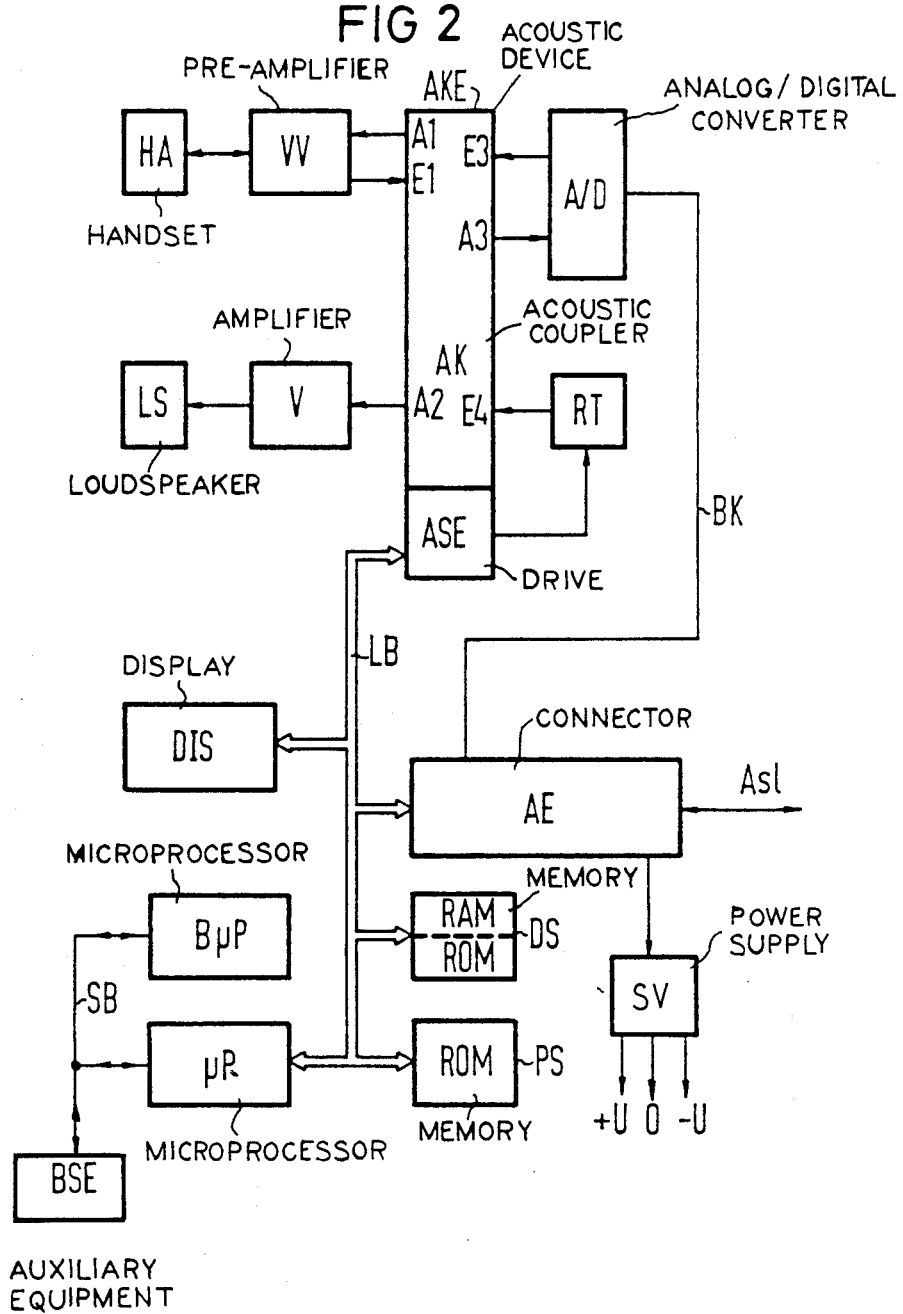

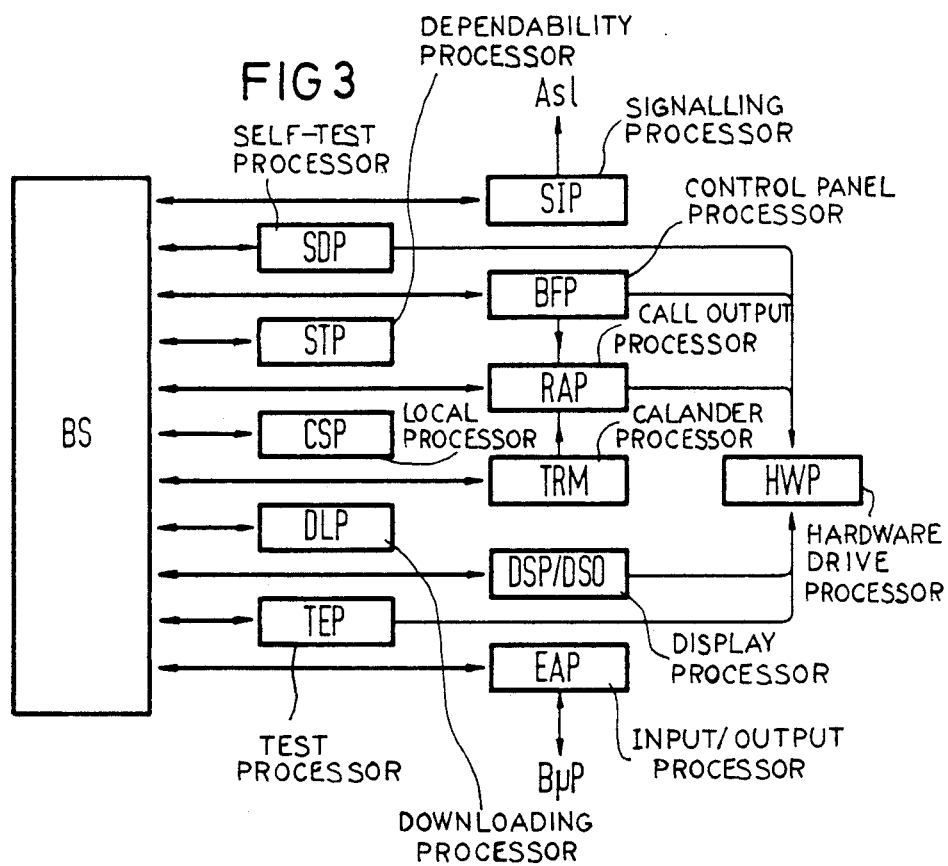

FIG 4

```
      ┌─────────────┐
      │    MBJ      │
      ├─────────────┤
      │   L = n     │
      ├─────────────┤
      │  MC = DLR   │
      ├─────────────┤
   ┌  │   GG;  GA   │
   │  ├─────────────┤
   │  │   DL = JX   │
   │  ├─────────────┤
   │  │    POS      │
NT │  ├─────────────┤
   │  │    SON      │
   │  ├─────────────┤
   │  │   DL - V    │
   └  ├─────────────┤
      │ BS1: GG; GA │  ┐
      ├─────────────┤  │
      │     ⋮       │  │ BS
      ├─────────────┤  │
      │ BSn: GG; GA │  ┘
      ├─────────────┤
      │    MEJ      │
      └─────────────┘
           PAM
```

FIG 5

PSM

```
      ┌──────────────┐
      │    MBJ       │
      ├──────────────┤
      │   L = n      │
      ├──────────────┤
      │  MC = DLS    │
      ├──────────────┤
      │   ΣLDL       │
      ├──────────────┤
      │    PG        │
      ├──────────────┤
      │    POS       │
      ├──────────────┤
      │   DL - V     │
      ├──────────────┤
      │ DL = Index   │
      ├──────────────┤
      │DL = Subindex │
      ├──────────────┤
      │    MEJ       │
      └──────────────┘
```

FIG 6

```
      ┌─────────────┐
      │    MBJ      │
      ├─────────────┤
      │   L = n     │
      ├─────────────┤
      │  MC = DLE   │
      ├─────────────┤
      │     P       │
      ├─────────────┤
      │     ⋮       │
      ├─────────────┤
      │     P       │
      ├─────────────┤
      │    MEJ      │
      └─────────────┘
```

METHOD FOR TRANSMITTING TERMINAL-SPECIFYING PROGRAM PARAMETER DATA FROM A COMMUNICATIONS INSTALLATON TO COMMUNICATIONS TERMINAL EQUIPMENT

BACKGROUND OF THE INVENTION

In existing, centrally controlled communications installation, information regarding the type, equipment features and terminal positions of connected communications terminal equipment is predominantly stored in the communications installation. In predominantly program-controlled communications installation, this information is usually defined by suitable program parameters. The data for every communications terminal equipment are thereby separately stored in a region provided therefor in the database that is usually established in a program-controlled communications installation. With the use of this data that describes the type, equipment and position of the communication terminal equipment, and with suitably implemented programs, the exchange, maintenance and servicing functions allocated to the communication terminal equipment are realized in the communications installation. For some time, a frequent modification of the program parameter data has been required because of more complex communications terminal equipment and exchange, maintenance and servicing functions, particularly subscriber performance features. Due to the use of microprocessors and microcomputers, a part of the "intelligence" of the communications installation, i.e. a part of the functions, particularly input and output functions associated to the performance features and communications terminal equipment, that are realized in the communications installation can be moved into the communications terminal equipment. This means that at least one part of the program parameter data, those relevant for the respective communication terminals equipment, must be present in every communications terminal equipment in a memory provided for this purpose.

Further, German patent application No. P 37 32 679.1 proposes a method for code-transparent transmission of information in the signalling channel of a communications terminal equipment, whereby a message-oriented transmission protocol is employed. This message protocol is fundamentally defined by:

a start of message information;

an information that allows the summary check of the information of an information part (for example, by specifying the plurality of transmitted bits or bytes);

a message code information that indicates the type of message;

an information part that contains the information to be transmitted; and an end of message information.

What is thereby involved is a message protocol that is utilized between communications installation and communications terminal equipment for information exchange, for example signalling and maintenance information. The communications terminal equipment can thereby be realized both by a subscriber terminal equipment, for example, telephone, teletex apparatus, as well as by a servicing or maintenance means.

SUMMARY OF THE INVENTION

Based on a message-oriented method for transmitting information, an object of the present invention is to provide a method for transmitting the respective communications-equipment-specifying or relevant program parameter data from the communications installation to the respective communication terminal equipment.

The present invention involves a method for transmitting communications-terminal-specifying program parameter data, P, from a program-controlled communications installation, KA, to at least one of a plurality of program-controlled communications terminal equipment, KE, connected thereto each of which communicates with the communications installation, KA, via a prescriber signalling duplex channel with the assistance of a message-oriented transmission procedure. The method comprises the following:

the procedure based on a message protocol having;

a start of message character information, MBI, an information, L, that allows a summary check of the information of an information part, NT and of a message code information, MC, a message code information part, MC, indicating the type of message, the information part, NT, containing the information to be transmitted, and and end of message information; and the transmission of the program parameter data occurring in the following manner:

after the presence of a parameter transmission request generated in the communications installation, KA, or after the presence of a parameter transmission request transmitted to the communications installation, KA, a parameter request message, PAM;

being defined by a prescribed message code information, MC, as well as containing coded identification information that indicate type of communications terminal equipment, GG, GA, equipment of the communications terminal equipment, SOM, BS, as well as the position of the communications terminal equipment, POS, and containing an index information, IX, indicating the type of requested program parameter data, P, being formed after;

every re-synchronization of the signalling, every modification of the expansion of the communications terminal equipment, KE, and every resetting of the program controller, St-KE, a start of parameter message, PSM, corresponding to the message protocol is formed in the communications installation, KA, and is transmitted to at least one communications terminal equipment, KE;

whereby the start of parameter message, PSM, defined by a prescribed message code information, MC, contains;

type of communications terminal equipment information as well as position of communications terminal equipment information, GG, GA, POS, in the sense of a specification of destination address criteria; and a parameter index information and sub-index information, IX, SIX, defining the type of transmitted program parameter data, P;

in its information part, MT, at least one parameter message, PM, formed in the communications installation, KA, transmitted to at least one communications terminal equipment, KE, said parameter message, PM, being defined by a prescribed message code information, MC, and containing the program parameter data, P, in its information part, NT;

whereby the received program parameter data, P, are stored in respectively allocated regions of a memory, M, in the communications terminal equipment, KE, on the basis of the parameter index, IX, and of the subindex, SIX.

The critical advantage of the method of the present invention is that the program parameter data can be transmitted either to one communications terminal equipment, to a plurality of communications terminal equipment or to all communications terminal equipment both after an internal request of the communications installations as well as after a communications terminal equipment request. Address criteria which provides for the selection of the communications terminal equipment are not provided in the message-oriented, point-to-point transmission protocol but are inserted into the information part of a start of parameter message, being inserted therein in the form of a type of communications terminal equipment and position information for the communications terminal equipment. The type information for the communications terminal equipment are defined in the information part of a parameter request message by a size of equipment and expansion of equipment information. In a start of parameter message, the broadcast or position validity information can be alternatively inserted instead of the size of apparatus and expansion of apparatus information.

An insertion of a broadcast information effects that the start of parameter messages and the allocated parameter messages are transmitted to all communications terminal equipment connected to the communications installation, for example, in the sense of a current distribution of the program parameters of "time of day" and calendar.

When an equipment size and equipment expansion information is entered into the start of parameter message, then these start of parameter messages and the allocated parameter messages are transmitted to the group of communications terminal equipment defined by the equipment size and equipment expansion information, for example, to telephone terminal equipment having a given, expanded keyboard.

A start of parameter message and the allocated parameter messages can be designationally transmitted to the requesting communications terminal equipment predominantly following a parameter transmission request initiated by a communications terminal equipment. This is achieved in that a position validity information and a position information are inserted into the start of parameter message. The insertion of the position validity information effects that the start of parameter message and the allocated parameter messages are transmitted only to the communications terminal equipment specified by the position information. The position information can be advantageously defined by a device number or by a terminal position information. For example, the terminal position information is indicated as a physical or logical port number of the communications installation.

The type of communications terminal equipment information inserted into a parameter request message transmitted from the communications terminal equipment to the communications installation serves for the designational identification of the respective communications terminal equipment in the communications system. A further information serving for the identification of the communications terminal equipment represents an equipment information of the communications terminal equipment that is inserted into the parameter request message. In accord and with another advantageous improvement, this is defined by a special equipment information and by an auxiliary equipment information composed of type and expansion information. A special equipment information specified in coded form, can, for example, indicate a loudspeaker arranged in the communications terminal equipment or can indicate a performance feature of "open listening" in the communications terminal equipment. For example, the telephone number memory means defined by a type information and having a plurality of key elements determined by the expansion information represents an auxiliary equipment.

A safeguarding information can be inserted into the start of parameter message for the summary checking of program parameter data allocated to a start of parameter message and transmitted by the parameter message. For example, the program parameter data can be summarily checked on the basis of a quantity information in bits or bytes inserted into the start of parameter message or on the basis of a logically defined parity information.

For a further safeguarding of the program parameter data allocated to a start of parameter message, a message code information indicating the end of transmission is inserted into the start of parameter message. This safeguarding measure provides that the end of transmission of program parameter data allocated to a start of parameter message can also be unambiguously recognized when the safeguarding information that enables the summary check were faultily transmitted.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block diagram of a communications installation including the connection region of the communications terminal equipment;

FIG. 2 is a block circuit diagram of the hardware components of a communications terminal equipment;

FIG. 3 is the process architecture of a communications terminal equipment realized according to FIG. 2, shown in a block circuit diagram;

FIG. 4 is a diagram of the structure of a parameter request message;

FIG. 5 is a diagram of the structure of a start up parameter message; and

FIG. 6 is a diagram of the structure of a parameter message.

DESCRIPTION OF THE PREFERRED EMBODIMENT

As an example, FIG. 1 shows a communications system underlying the method of the invention that is formed by a communications or, respectively, switching installation KA and by communications terminal equipment KE connected thereto. The communications installation KA is essentially subdivided into three hierarchic structure levels. The periphery level that essentially serves for the connection of terminal equipment and lines is formed by three periphery modules PER1, PER2, PER3 each of which is respectively formed of a plurality of subscriber connection modules or, respectively, line termination units such that a maximum of 64 ports, for example, 32 2-wire line terminations, are accessible at the periphery module PER1 . . . PER3.

The subscriber connection modules, for example, can serve for the connection of analog subscriber terminal equipment. They then usually comprise an interface means per terminal equipment having call indication and loop closure indication to which a processor means for analog-to-digital or, respectively, digital-to-analog conversion and for programmable input impedance or, respectively, level matching is respectively allocated. One possible realization of these components of a subscriber connection module may be derived from U. S. Pat. No. 4,381,561 (herein incorporated by reference). The interface between a maximum of 16 such line-associated equipment and internal communications installation PCM connections or, respectively, HDLC control lines (high level data link control) is formed by a module processor control whose structure and functioning, for example, can correspond to the processor disclosed in U.S. Pat. No. 4,694,452 (herein incorporated by reference). Further details of the function of this processor may be derived from the product publication of Siemens AG, PDC Peripheral Board Controller PEB 2050 (SM 205), Preliminary Technical Description (Part I), Ordering Number B/2684-101.

Other connector assemblies for, for example, digital or ISDN equipment or, respectively, trunk lines can be provided in each of the periphery modules PER1, PER2, PER3 either alone, additionally or in combination. Let it be assumed for the exemplary embodiment that it is predominantly digital or, respectively, ISDN-oriented communication terminal equipment KE that are provided. Digital communications terminal equipment KE are connected to these connector assemblies via mostly integrated transmission technology and digital central office lines ASL. These communications terminal equipment KE are respectively equipped with a controller ST-KE usually realized in micro-processor technology and with a memory M respectively subdivided into a program memory and data memory. In addition to individual user data, for example, telephone numbers, the program parameter data are also stored in the data memory realized, for example, as a non-volatile memory. Auxiliary equipment BG can be connected to the communications terminal equipment KE via a respectively suitable interface. For example, these can be telephone number memories or chip card readers. The control of the auxiliary equipment BG is usually assumed at least in part by the controller STKE of the communications terminal equipment.

The module processor controls essentially formed by module processor controllers and at least one micro-processor serving for the coordination thereof respectively administer two PCM-structured connections (PCM highways) PCM2, PCM3; PCM 4, PCM5; PCM6, PCM7 and a respective bidirectional connection for forwarding and accepting control information that are transmitted in the standardized transmission procedure HDLC. A further periphery module PER0 serves the purpose of supplying the communications system with call progress tones, announcements and music when connections are on hold. The additional periphery module PER0 also contains audible character receivers, transmission and reception equipment for selection signals transmission in dual tone multi-frequency signalling as well as test transmitters and test receivers.

The additional periphery module PER0, similar to the periphery modules PER1, PER2, PER3, is connected via two PCM highways, PCM0, PCM1 as well as via an information transmission link HDLC0.

The next structure level of the digital communications system is formed by a total of four (control information) transmission modules HDLC-C0, HDLC-C1, HDLC-C2, HDLC-C3 (HDLC controllers) as well as by two input/output processors IOP1, IOP2, whereof the input/output processor IOP1 is allocated to the two transmission modules HDLC-0 and HDLC-C1 but the input/output processor IOP2, by contrast, is allocated to the transmission modules HDLC-C2, HDLC-C3.

Since the HDLC standard is used for the exchange of data, instructions and messages in many appertaining, practically realized systems, corresponding (control information) transmission modules are realized in the form of integrated circuit; the communications installation shown in FIG. 1 utilizes these modules (HDLC controllers) in the standard way, so that no hardware or software modifications are required for the utilization of these modules in the communications installation. The block check field is of special significance in the data transmission blocks defined in the HDLC standard within the framework of the communications system since a forwarding of control information secured against errors is possible with the block check character sequence transmitted in this field.

A digital switching matrix network module MTS to which all PCM highways, PCM0, PCM1 . . . PCM14, PCM15 are connected also belongs in the same structure level as the (control information) transmission modules HDLC-C0 . . HDLC-C3 For example, the digital switching matrix network module is realized by the integrated circuit PEB 2040 of Siemens AG. The structure and functioning of a digital switching matrix network module are disclosed, for example, in U. S. Pat. No. 678,206 (herein incorporated by reference).

A conference network CON that is connected to the digital switching matrix network module MTS with two further PCM highways PCM8, PCM9 is also inserted into the structure level of the transmission modules HDLC-C0 . . . HDLC3 and of the digital switching matrix network module MTS. A possible realization of the conference networks CON is disclosed in U. S. Pat. No. 4,054,757 (herein incorporated by reference).

Like the two inputs/output processors IOP1, IOP2, the digital switching matrix network module MTS and the conference network CON are connected to a local multiplex bus LB that represents the interface to the hierarchically highest structure level of the digital communications installation. This structure level is formed by a central control processor DP that coordinates the interaction of all assemblies and modules of the communications installation. In addition to being equipped with clock-generating devices, the central control processor DP is equipped with a micro-processor $\mu p$, with a preceding access controller AC0 and with a memory MEM. The program parameter data PD for every communications terminal equipment KE are stored in this memory MEM in a memory region provided for this purpose. The critical functions of the central control processor are, thus, the storage and request-suited handling of switching-oriented programs and, facing toward the periphery, the control and monitoring of the local bus LB. Additional standard functions of the central control processor are operations-oriented handling, dependability-oriented displays as well as clock generations.

The method of the invention is provided for the transmission of program parameter data between the communications installation KA and the communications terminal equipment KE connected thereto, i.e. essentially between the communications terminal equipment KE and the periphery modules PER1 . . . PER3. As initially set forth, the fundamental structure of the message-oriented transmission procedure has already been proposed in the German patent application P 37 32 679.1. The internal functions in the communications installation and communications terminal equipment for further-handling of the messages of the transmission procedure employed are realized in the respective control equipment with the assistance of appropriate software. Since these functions are not required for explaining the method of the invention, they have not been set forth in detail.

FIG. 2 shows a hardware block circuit diagram of a communications terminal equipment without hand-free means. The central equipment for controlling the subscriber user procedures, for controlling all acoustic signals to be transmitted in the communications terminal equipment and for controlling these signalling with the communications installation is realized by a microprocessor system $\mu p$. For example, this micro-processor system up can be formed by a Siemens micro-processor SAB 80 C 31. The micro-processor system $\mu p$ is connected to a program memory PS and to a data memory DS via a local bus LB formed of control, address and data lines. The program memory PS realized in ROM memory technology is designed, for example, for a program encompassing a maximum of 64k bytes. The data memory DS likewise encompassing, for example, 64k bytes can, for example, contain read-only memories executed in ROM memory technology in its one-half, for fixed data, parameter data and cables, and can contain memories executed in RAM memory technology in its other half, for example, for storing user-associated data. The micro-processor $\mu p$ additionally comprises a serial bus interface. This serial bus interface is connected to a control panel microprocessor system $B\mu p$ via the serial bus SB. The auxiliary equipment BSE connected to the communications equipment are also operated via this serial bus SB. The coded information generated by the operating elements are recognized in the control panel micro-processor system $B\mu p$, are serially transmitted to the micro-processor system $\mu p$ via the serial bus SB and are further-processed in the micro-processor system up into signalling information and into operator guidance information, for example, for light-emitting diodes, tones and displays in a display means.

Further, a display means DIS is connected to the local bus LB. For example, the display means DIS is realized by a LCD display (two lines of 24 characters each).

This LCD display is utilized for displaying numerals and plane text. Given employment of the communications trouble equipment as an exchange equipment, the display means DIS can be realized, for example, with a LCD display (eight lines of 40 characters each).

The communications terminal equipment is connected to a subscriber line as1 via a connector equipment AE. The communications terminal equipment communicates with a communications installation via this subscriber line as1. The message encompassing 64 kbit/s and the signalling information encompassing 8 kbit/s are bidirectionally communicated via the subscriber as1. The signalling information transmitted in the signalling channel are structured according to the OSI reference model. The lower three protocol layers of the seven abstracted protocol layers of the OSI reference model are realized. The protocol layers utilized for the signalling between the communications terminal equipment and communications installations are defined as bit transmission layer (layer 1), as dependability layer (layer 2) and as switching layer (layer 3). The bit transmission layer, also referred to as physical level, manages the transmitting of the information in the message and signalling channels in both directions simultaneously. The activation, deactivation and operation of the communications terminal equipment are thereby included. The dependability layer assumes the safeguarded transmitting of the signalling information between the communications installation and the communications terminal equipment for the adjoining transmission layer. For example, this can ensue with an HDLC transmission procedure or with a last-look procedure. What is to be understood by last-look procedure is a multiple transmission of the information that must be recognized as identical at least twice in succession in the receiving equipment and must also be different from the most recently received, valid signalling information in order to be recognized as being valid.

The transmission layer serves for the set-up, monitoring and clear-down of the communications connections as well as for the control and monitoring of the performance features supported by the communications installation. The connector equipment essentially realizes the functions of the bit transmission layer (layer 1) under the control of the microprocessor system $\mu p$. The following, essential functions are contained in the connector equipment AE:

transmission-oriented adaptation to the subscriber line as1;

transmitting the signalling and message information with signals formed according to a burst mode transmission method;

separating message information and signalling information and forwarding to the appropriate equipment; and out-coupling an electrical energy transmitted via the subscriber line as1 and offered by the communications installation and the forwarding thereof to an internal power supply SV of the communications terminal equipment.

For example, the connector equipment AE is realized with a LSI, customized circuit and with a plurality of layer circuits.

In the power supply SV, the electrical energy communicated from the connector equipment AE is converted into a positive and negative feed voltage $\pm U$ that is required for the operation of the communications terminal equipment. These power supplies SV are preferably realized by space-saving switch controller power supplies.

The signalling information separated in the connector equipment AE from the information transmitted via the subscriber line as1 are edited suitable for the local bus and are transmitted via the local bus LB to the microprocessor system $\mu p$. In the microprocessor system $\mu p$, these signalling information are further-processed according to the functions allocated to the dependability layer and the switching layer and the corresponding reactions, for example, selecting output units, are initiated. The message information separated in the connector equipment AE proceed to an analog-to-digital converter means AD. Analog voice signals are formed in the latter from the digitized message or, respectively, voice signals output from the connector equipment AE. The analog voice signals incoming at a further input of the analog-to-digital converter means A/D are converted into digital voice signals. The coding or, respectively, decoding of the analog or, respectively, digital voice signals ensues on the basis of the known, standardized PCM method. The analog voice signals proceed via a corresponding connection to a third input E3 of an acoustic means AKE. The acoustic means AKE is composed of an acoustic coupler AK and of a drive means ASE. The acoustic coupler AK switches the analog signals incoming from the analog-to-digital converter means A/D either only to a first output A1 or to the first and to a second output A1, A2. Output A1 is connected to the handset of the communications terminal equipment via a pre-amplifier VV. After the through-connection of the connection, the analog voice signals are conducted via the pre-amplifier VV in every instance to a receiver earpiece arranged in the handset HA. Analogous thereto, the voice signals output by a microphone arranged in the handset HA proceed via the pre-amplifier VV to a first input E1 of the acoustic coupler AK. The acoustic coupler AK switches the analog voice signals to a third output A3 connected to the analog-to-digital converter means A/D. These analog voice signals are converted into digital signals in the analog-to-digital converter means A/D and, in the connector equipment AE, are inserted into the message stream communicated to the subscriber line as1. When the performance feature "open listening" is activated in the communications terminal equipment by, for example, a corresponding key stimulus, then the analog voice signals incoming at the third input E3 are simultaneously conducted to a second output A2 of the acoustic coupler AK. From the latter, the analog voice signals proceed via an amplifier V to a loudspeaker LS arranged in the communications terminal equipment. The drive equipment ASE arranged in the acoustic means AKE is connected both to the acoustic coupler AK as well as to the local bus LB. In this drive equipment ASE, the control instructions communicated from the microprocessor system $\mu p$ via the local bus LB are converted into information with which the connecting paths in the acoustic coupler AK are set. For example, the acoustic coupler AK is realized by analog crosspoints executed in CMOS technology. In addition, the drive equipment ASE controls a call tone generator RT that, dependent on the drive, generates different call tones having corresponding call rhythms. These call tones are communicated to the handset HA and/or to the loudspeaker LS via the acoustic coupler AK under the control of the drive equipment ASE.

FIG. 3 shows the process architecture of the microprocessor system $\mu p$. The information exchange or, respectively, data exchange between the individual processors fundamentally occurs via an operating system tailored to the microprocessor system $\mu p$—with a few exceptions. Such an operating system, for example, represents the operating system COSMOS 51 provided the Siemens Microprocessor System 80 C 51. This operating system offers uniform organizational interfaces for the information exchange among the processors.

The following processors are realized in the microprocessor system $\mu p$:

control panel processor BFP;

the control panel processor administers the operating procedures defined in the terminal equipment and also administers the exchange-oriented procedures that are provided in the interaction with the communications installation. Only the operating procedures, initialized by key stimulus, that are known to the communications terminal equipment are administered. For example, such procedures or, respectively, functions are represented by;

the control of the call volume,
the switching-oriented line handling,
control of the acoustic means, etc., and
Local Processor CSP.

All local and system-related operating procedures and storing functions, such as, for example, name keys, abbreviated dial codes, deadlines, etc., are realized by this process.

Display Processor DSP/DSO is divided into an administration processor and into an output processor DSP/DSO. Two different display quantities, see the explanations to FIG. 1, are controlled and administered with the assistance of this display processor. Which of the two display quantities is present in the communications terminal equipment and is to be controlled or, respectively, administered is determined by the parameter data transmitted from the communications installation. Among the jobs included in the display processor are:

the administration of a display data memory,
a priority control dependent on the display quantity, and
a formation of time of day and date (day, month) according to a basic setting prescribed by the communications installation by the transmission of parameter data and according to periodic synchronization by the communications installation.

In the call output processor RAP different call types are formed by the call output processor RAP and are transmitted to the requesting or, respectively following processes dependent on a call priority. The call rhythms are generated via time generators implemented in the call output processor RAP. The call natures, types and priorities provided for the respective communications terminal equipment are determined by the parameter data transmitted from the communications installation.

In the parameter data transmission processor DLP the parameter data transmission processor DLP (down loading processor) configures the user's surface of the communications terminal equipment as well as the performance features thereof. It automatically monitors its data domain and also executes error correction as warranted. The parameter data transmission processor DLP additionally makes a series of access procedures available for other processes while which the parameter data it administers can be interrogated. The parameter data can be requested by the communications installation and transmitted individually or block-by-block after an initialization in the communications terminal equipment.

In the dependability-oriented processor STP this secretly sequencing process controls the program watchdog produces error protocols about acquired errors and successively checks every sub-microprocessor utilized in the communications terminal equipment.

In the signalling processor SIP this processor realizes the central data transmission interface between the communications installation and the communications terminal equipment. The reception and the sending of the signalling information are executed with the assistance of this signalling process. The individual, received signalling information are thereby evaluated in the last-look method, see the description of FIG. 1. The recognized signalling information are converted into appropriate stimuli for forwarding to the processes to be selected. Analogous thereto, the stimuli or, respectively, information communicated from the remaining processes are converted into corresponding signalling information.

In the input/output processor EAP this input/output processor EAP realizes the interface to the sub-microprocessors (for example, control panel microprocessor) via the serial bus SB. With the assistance of this input-/output processor EAP, the physical data transmitted from the sub-microprocessors are converted into logical information for the selection of the remaining processes. Analogously, thereto, the logical information transmitted from the other processes are converted into physical information for the selection of the sub-microprocessors.

In the test processor TEP the test processor TEP essentially serves test purposes during the development phase and during a later maintenance of the communication terminal equipment. This test processor edits information for a communications terminal equipment tester and communicates them to it. The internal data accesses of the communications terminal equipment thereby ensue via access procedures present in the other processes.

In the hardware driver processor HWP the hardware driver processor HWP represents the connecting link between the program-controlled processes and the hardware elements of the communications terminal equipment. It has the driver routines required for the control of the hardware elements available to it. For example, the following events are controlled by the hardware driver process HWP:

switching the handset on and off;
controlling the call;
switching the voice channel on and off;
switching the loudspeaker amplifier on and off, etc.

The hardware driver processor HWP is the only one that does not communicate with the remaining processes via the operating system BS. The control information proceed to or come directly from the processes in whose execution the control of a hardware element allocated to the hardware driver processor HWP is provided. This measure is meaningful since no different process executions occur in a selection of a hardware element and vice versa.

In the self-test processor SDP a self-test of the communications terminal equipment is initiated and ended by the communications installation. The results of the self-test process SDP are acoustically and optically displayed and are communicated to the communications installation. Belonging to the self-test functions are:

a light-emitting diode test;
a key monitoring;
tone test;
display of the error memory contents;
a test of the hardware components, etc.; and
calendar processor TRM.

A date or deadline calendar for, for example, 15 entries is administered in this calendar processor TRM. The individual dates are thereby automatically arranged in chronological order and monitored. The deadline expiration is acoustically reported with, for example, a reminder call or is reported with an optical display. It can also be indicated via a light-emitting diode whether deadlines are sequencing.

The individual protocol messages are shown and the possible informational contents of these messages are indicated below with references to FIGS. 4-6.

Thus, FIG. 4 shows a parameter request message PAM that is formed in the communications terminal equipment KE and transmitted to the communications installation KA after every re-synchronization of the signalling; after every change of the expansion of the communications terminal equipment; and after every resetting of the program control.

Every message, even those set forth later, is provided with a start of message and an end of message information MBI, MEI. These start up message or, respectively, end of message information MBI, MEI can be formed, for example, by a one byte start of message character (for example, corresponding to the HDLC transmission procedure) or by a two-byte information (see the aforementioned German patent application P 37 32 679.1). Let it be assumed for the exemplary embodiment that the start-up message and end of message information MBI, MEI is formed by a two-byte information. The bit combination of the first byte is thereby defined such that this does not collide with the coded information of a following information part of the parameter request message PAM that are employed. What this first byte indicates, accordingly, is that a character is involved that is defined outside of the character scope of the coded information employed. The nature of the character is defined with the second byte. Thus, a bit combination in hexadecimal notation EF can be allocated to the first byte, for example, referred to as transport character. The bit combination "hexadecimal 01" can be allocated to the second byte, for example, for the start of message information MBI, and the bit combination "hexadecimal 02" can be allocated thereto for the end of message information MEI. This bit combination can coincide with that bit combination that indicates the message-free (idle) condition in the signalling channel. A length of message information L that, for example, encompasses one byte is attached to the start of message information MBI. This length of message information L indicates the plurality n of bytes that a following information part MT contains. The message code information MC defines the type of protocol message to be transmitted. Since a parameter request message PAM is to be defined, a corresponding, coded message code information MC-DLR, for example hexadecimal 51-H is entered. The type of communications terminal equipment is specified by the following information that, for example, encompasses two bytes. This type of communications terminal equipment information is composed of an equipment size information and of an equipment expansion information GG, GA. The equipment size information GD specifies whether, for example, a single telephone, a team telephone, an exchange location or an operations-oriented console is involved. The equipment expansion information GA indicates the expansion of the communications terminal equipment KE with respect to the size of the keyboard, size of the displays and further operating elements. The index information IX that, for example, encompasses one byte that is transmitted following the type of communications terminal equipment information indicates what type of program parameter data P are to be transmitted from the communications installation KA to the communications terminal equipment KE. For example, the index information IX listed below are thus possible:

key occupation information for different communications terminal equipment types and expansion levels;
acoustic call outputs;
types of call;
control of the displays in the communications terminal equipment;
time of day;
fixed texts;
performance features;
line functions;
message formats;
transmission of program parameter data is not desired; and
program parameter data P not yet received from the communications installation KA.

The position information POS for the communications terminal equipment that again encompasses one byte is attached to the index information IX. For example, this position information POS can be formed by a logical device number or by a terminal position information. For example, the terminal position information can be indicated by a logical or physical port number of the communications installation.

The position information POS is followed by a special equipment information SON. This special equipment information SON that encompasses one byte can, for example, be organized in bit-oriented fashion. For example, the information contents of the individual bits can thus define whether, for example, "open hearing", "hands free talking", etc., is realized in the communications terminal equipment KE. They subsequently transmitted information DL-V that likewise encompasses one byte indicates to the communications installation KA what degree of updating the program parameter data P stored in the communications terminal equipment KE have. With the assistance of this information DL-V, a determination can be made in the communications installation KA whether the program parameter data P stored in the communications terminal equipment KE still correspond to the current status. An auxiliary equipment information BS that, for example, encompasses three bytes is attached to this information DL-V that indicates the status of the program parameter data P. The presence, the type and the level of expansion of auxiliary equipment is identified by this auxiliary equipment information BS. For example, an auxiliary equipment is thereby defined by an auxiliary equipment information BS encompassing one byte that is composed of type and expansion information GG, GA. When no auxiliary equipment information BS are entered in the parameter request message PAM, then no auxiliary equipment is connected to the respective communications terminal equipment KE. The type of auxiliary equipment, for example, telephone number storing means or card reader, is defined by the type information GG. The level of expansion of the respective communications terminal equipment, for example the plurality of keys of a telephone number store, is indicated by an expansion information GA.

FIG. 5 shows the fundamental structure of a start of parameter message PSM. A start of parameter message PSM is generated in the communications installation KA either after reception and evaluation of a parameter request message PAM or of an internal parameter transmission request of the communications installation and is transmitted to the communications terminal equipment KE. The start of message and end of message information MBI, MEI is thereby formed in accordance with the message shown in FIG. 2. A message is specified as a start of parameter message PSM by a prescribed, coded, for example, hexadecimally 2 BH, message code information MC-DLS. A protection information LDA is attached to the message code information MC. The sum of the bytes that are subsequently transmitted to the start of parameter message PSM is indicated, for example, in this protection information LDA. Following this protection information LDL, a type of communications terminal equipment information GG, GA that encompasses one byte is transmitted. As already set forth, this type of communications terminal equipment is formed by an equipment size and by an equipment expansion information GG, GA. Alternatively, as already set forth in the introduction to the specification, a broadcast or position validity information PG can be inserted. Let it be assumed for the exemplary embodiment that the start of parameter message PSM is to be designationally transmitted to a communications terminal equipment KE. A type of communications terminal equipment GG, GA is thus formed by a position validity information PG. The entry of the position validity information PG effects that this start of parameter message PSM is transmitted to the communications terminal equipment KE specified by a following position information POS. This position information POS that again encompasses one byte can, for example, again be indicated by a logical device number or by a terminal position information. An information DL-V encompassing one byte that indicates the version, i.e. the state of the updating of the program parameter data p subsequently transmitted can be attached to the position information POS. The following index and sub-index information, IX, SIX that each encompass one byte specified in detail what program parameter data P are being transmitted following this start of parameter message PSM. For example, the index information IX are formed by the coded information explained in FIG. 1. When necessary, the sub-index information SIX indicate the allocation of the program parameter data P in detail. For example, a physical key number information is thus entered as sub-index information SIX when, for example, it is specified in the index information IX that the program parameter data P to be transmitted contain the key occupation of a telephone. This start of parameter message PSM is designationally transmitted from the communications installation KA to the communications terminal equipment KE specified by the position information POS. After reception and evaluation of the start of parameter message PSM, the terminal equipment in this communications terminal equipment KE is prepared for the reception of the program parameter data P subsequently transmitted from the communications installation KA. These program parameter data P are transmitted from the communications installation KA to the communications terminal equipment KE with the assistance of a parameter message PM.

FIG. 6 shows the fundamental structure of a parameter message PM. Start of message information, end of message information and length information MBI, MEI, L are again formed in accord with FIG. 1. A message is defined as a parameter message PM by a prescribed, coded, for example, hexadecimally 2 BH, message code information DLE. The program parameter data P are transmitted following the message code information DLE. Usually, the plurality of bits or, respectively, bytes per parameter message PM is limited to a prescribed plurality, for example, 128 bytes. When the quantity of program parameter data exceeds the maximum message length of a parameter message PM, these are transmitted with a plurality of parameter messages PM. The parameter data P are received in the communications terminal equipment KE and are stored in the respectively allocated memory regions of the memory M of the communications terminal equipment KE in accord with the index and sub-index information Ix, SIX transmitted in the start of parameter message PSM.

A reference to the term "processor" in the above description also is equivalent to the term "process" which refers to actual execution of a function.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for transmitting communications-terminal-specifying program parameter data, P, from a program-controlled communications installation, KA, to at least one of a plurality of program-controlled communications terminal equipment, KE, connected thereto each of which communicates with the communications installation, KA, via a prescriber signalling duplex channel with the assistance of a message-oriented transmission procedure, comprising:
   the procedure based on a message protocol having;
   a start of message character information, MBI,
   an information, L, that allows a summary check of the information of an information part, NT and of a message code information, MC,
   a message code information, MC, indicating the type of message,
   the information part, NT, containing the information to be transmitted, and
   an end of message information; and the transmission of the program parameter data occurring in the following manner:
   after the presence of a parameter transmission request generated in the communications installation, KA, or
   after the presence of a parameter transmission request transmitted to the communications installation, KA, a parameter request message, PAM;
   being defined by a prescribed message code information, MC,
   as well as containing coded identification information that indicate type of communications terminal equipment, GG, GA, equipment of the communications terminal equipment, SON BS, as well as the position of the communications terminal equipment, POS, and
   containing an index information, IX, indicating the type of requested program parameter data, P, being formed after;
   every re-synchronization of the signalling,
   every modification of the expansion of the communications terminal equipment, KE, and
   every resetting of the program controller, St-KE, a start of parameter message, PSM, corresponding to the message protocol is formed in the communications installation, KA, and is transmitted to at least one communications terminal equipment, KE;
   whereby the start of parameter message, PSM, defined by a prescribed message code information, MC, contains;
   type of communications terminal equipment information as well as position of communications terminal equipment information, GG, GA, POS, in the sense of a specification of destination address criteria; and
   a parameter index information and sub-index information, IX, SIX, defining the type of transmitted program parameter data, P;
   in its information part, NT, at least one parameter message, PM, formed in the communications installation, KA, transmitted to at least one communications terminal equipment, KE, said parameter message, PM, being defined by a prescribed message code information, MC, and containing the program parameter data, P, in its information part, NT;
   whereby the received program parameter data, P, are stored in respectively allocated regions of a memory, M, in the communications terminal equipment, KE, on the basis of the parameter index, IX, and of the sub-index, SIX.

2. The method according to claim 1, wherein an information, LDL, that enables the summary checking of the transmitted program parameter data, P, is inserted in the information part, NT, of the start of parameter message, PSM.

3. The method according to claim 1, wherein a last parameter message, PM, allocated to a start of parameter message, PSM, is defined by a prescribed message code information, MC, that indicates the end of transmission.

4. The method according to claim 1, wherein the information, GG, GA, indicating the type of communications terminal equipment is defined in a parameter request message, PAM, by an equipment size information, GG, and an equipment expansion information, GA, and in a start of parameter message, PSM, alternatively by a broadcast or position validity information, PG.

5. The method according to claim 1, wherein an equipment information for the communications terminal equipment, SON, BS, is defined by special equipment information, SON, and by an auxiliary equipment information, BS, composed of a type information and expansion information, GG, GA.

6. The method according to claim 1, wherein the position information, POS, can be defined by a device number or by a terminal position information.

7. A method for transmitting communications-terminal-specifying program parameter data, P, from a program-controlled communications installation, KA, to at least one of a plurality of program-controlled communications terminal equipment, KE, connected thereto each of which communicates with the communications installation, KA, via a prescriber signalling duplex channel with the assistance of a message-oriented transmission procedure, comprising:
   the procedure based on a message protocol having;
   a start of message character information, MBI,
   an information, L, that allows a summary check of the information of an information part, NT and of a message code information, MC, a message code information, MC, indicating the type of message, the information part, NT, containing the information to be transmitted, and an end of message information; and the transmission of the program parameter data occurring in the following manner:

after the presence of a parameter transmission request generated in the communications installation, KA, or after the presence of a parameter transmission request transmitted to the communications installation, KA, a parameter request message, PAM;

being defined by a prescribed message code information, MC, as well as containing coded identification information that indicate type of communications terminal equipment, GG, GA, equipment of the communications terminal equipment, SON, BS, as well as the position of the communications terminal equipment, POS, and containing an index information, IX. indicating the type of requested program parameter data, P, being formed after;

every re-synchronization of the signalling, every modification of the expansion of the communications terminal equipment, KE, and every resetting of the program con roller, St-KE, a start of parameter message, PSM, corresponding to the message protocol is formed in the communications installation, KA, and is transmitted to at least one communications terminal equipment, KE;

whereby the start of parameter message, PSM, defined by a prescribed message code information, MC, contains;

type of communications terminal equipment information as well as position of communications terminal equipment information, GG, GA, POS, in the sense of a specification of destination address criteria; and a parameter index information and sub-index information, IX, SIX, defining the type of transmitted program parameter data, P;

in its information part, NT, at least one parameter message, PM, formed in the communications installation, KA, transmitted to at least one communications terminal equipment, KE, said parameter message, PM, being defined by a prescribed message code information, MC, and containing the program parameter data, P, in its information part, NT;

whereby the received program parameter data, P, are stored in respectively allocated regions of a memory, M, in the communications terminal equipment, KE, on the basis of the parameter index, IX, and of the sub-index, SIX;

an information, LDL, that enables the summary checking of the transmitted program parameter data, P, inserted in the information part, NT, of the start of parameter message, PSM;

a last parameter message, PM, allocated to a start of parameter message, PSM, defined by a prescribed message code information, MC, that indicates the end of transmission;

the information, GG, GA, indicating the type of communications terminal equipment defined in a parameter request message, PAM, by an equipment size information, GG, and an equipment expansion information, GA, and in a start of parameter message, PSM, alternatively by a broadcast or position validity information, PG; and an equipment information for the communications terminal equipment, SON, BS, defined by special equipment information, SON, and by an auxiliary equipment information, BS, composed of a type information and expansion information, GG, GA.

8. The method according to claim 7, wherein the position information, POS, can be defined by a device number or by a terminal position information.

* * * * *